Aug. 26, 1930.                P. BRÉDIN                1,774,225
DEVICE FOR CUTTING SHEET GLASS
Filed April 22, 1929
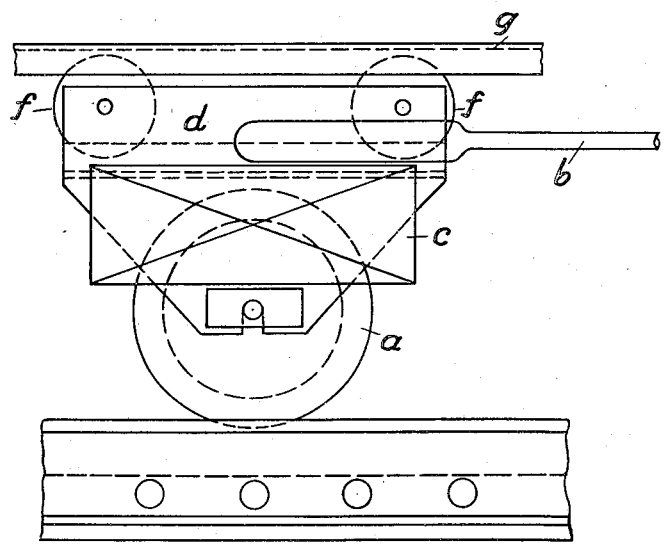
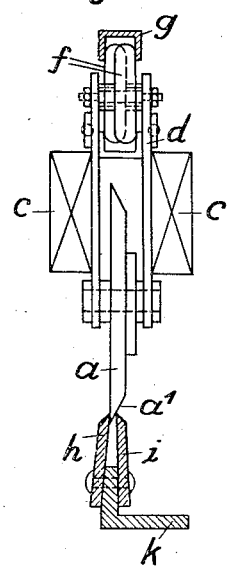
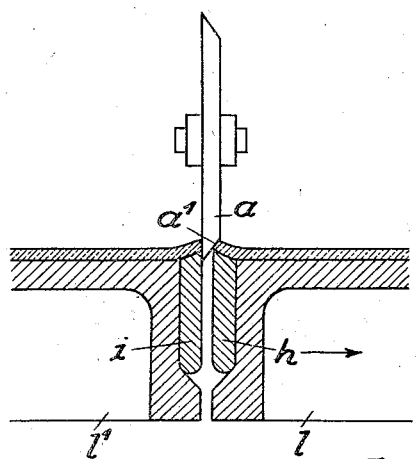
Inventor:
Pierre Brédin Patented Aug. 26, 1930

1,774,225

UNITED STATES PATENT OFFICE

PIERRE BRÉDIN, OF STOLBERG, GERMANY, ASSIGNOR, BY MESNE ASSIGNMENTS, TO THE AMERICAN BICHEROUX COMPANY, A CORPORATION OF DELAWARE

DEVICE FOR CUTTING SHEET GLASS

Application filed April 22, 1929, Serial No. 357,117, and in Germany May 16, 1928.

This invention relates to a new and improved device for cutting sheet glass into separate units, while in a plastic condition.

For cutting plastic sheet glass, devices have already been used which consist of a circular knife which is moved along and in shearing engagement with an edge of the support carrying the glass and consisting, for instance, of stationary casting tables or traveling transporting tables. These known knives are generally constructed as double knives which work simultaneously at two oppositely disposed edges and cut a strip out of the glass. The blades of these knives must be elastic to allow them to bear with tension against the shearing or cutting edges in order to attain smooth straight cuts.

It is the object of the invention to provide a cutting device of the kind stated in which the knife, which consists only of a single circular disk, needs no longer be elastic as the knives of the known devices. This object is attained by forming the cutting edge of the knife through a bevel provided on that side of the disk which is not in contact with the shearing edge and causing the knife to ride during the cutting operation with the beveled portion on a supporting and guiding edge disposed parallelly of the shearing edge.
A cutting device constructed in this manner has a longer life than the known devices, and it allows to effect sharp and straight cuts without it being necessary to cut a strip out of the glass.
An embodiment of the subject-matter of the invention is illustrated in the accompanying drawing. Fig. 1 is a front view of the cutting device, Fig. 2 is an end view of the device, partly in section, and Fig. 3 is a fractional longitudinal section of a glass support with a modified arrangement of the shearing and guiding edges with which the knife cooperates.

Referring now to the drawing in detail, $a$ is the circular knife which is mounted for rotation in a frame $d$. This frame is loaded by weights $c$ and adapted to be moved to and fro by means of a rod $b$ or the like. The frame $d$ is provided in its upper portion with two rollers $f$, which are preferably somewhat staggered with relation to each other and adapted to run in a grooved guide rail $g$.

Arranged in the glass support at the place where the glass is to be cut, are two parallel ledger bars $h$ and $i$ which leave a small gap between each other. The bar $h$ forms the shearing edge designed to co-act with the knife $a$. The cutting edge of the knife is formed by a bevel $a^1$ which is provided on that side of the knife which is turned away from the bar or shearing edge $h$. During the cutting operation the knife $a$ rides with the beveled portion $a^1$ on the edge of the bar $i$ which serves to support and guide the knife. Owing to this beveled portion resting on the bar $i$ during the cutting, the weight of the cutting device causes the knife $a$ to be constantly pressed against the shearing edge formed by the bar $h$, thereby ensuring straight and smooth cuts.

The two bars $h$ and $i$ may be fixed on a common supporting ledge $k$, as shown in Fig. 2. If the support for the glass consists of a number of stationary or traveling tables, such a ledge $k$ is fastened to one end of each table. As shown in Fig. 3, the bar $h$ can also be fastened to one end of a table $l$ and the other bar $i$ to the adjacent end of the following table $l^1$.

In case traveling transporting tables are used and it is desired to cut the glass sheet while being carried ahead by the tables, the cutting device has imparted to it in a well-known manner a movement in the direction of travel of the tables during the cutting operation.

Having thus described my invention, what I claim as new and desire to secure by Letters-Patent is:—

A device for cutting sheet glass, comprising in combination a support for the glass, a pair of spaced parallel edges in the support, a circular knife movable across the support along the parallel edges and in contact therewith, the knife having its cutting edge formed by a bevel on one of its sides, one of the said edges of the support forming a shearing edge to cooperate with the knife in severing the glass, and the other edge forming a guiding and supporting edge on which the beveled portion of the knife rides during the cutting movement over the glass.

In testimony whereof I have signed my name to this specification.

PIERRE BRÉDIN.